United States Patent Office 3,778,413
Patented Dec. 11, 1973

3,778,413
PROCESS FOR THE PREPARATION OF COPOLY-CONDENSATES COMPRISING REACTING PHENOL, A FURFURAL, A UREA AND AN ALIPHATIC ALDEHYDE
Hans Junger, Troisdorf, and Franz Weissenfels, Siegburg, Germany, assignors to Dynamit Nobel Aktiengesellschaft
No Drawing. Filed Dec. 15, 1970, Ser. No. 98,480
Claims priority, application Germany, Dec. 24, 1969, P 19 64 961.7
Int. Cl. C08g 9/10
U.S. Cl. 260—51.5                                  6 Claims

ABSTRACT OF THE DISCLOSURE

Production of copolycondensates of 0.1 to 1 mole of a phenol, 0.3 to 1 mole of a urea, 0.1 to 1 mole of a furan and 2 to 4 moles of an aliphatic aldehyde. These polycondensates are prepared by step-wise reaction where no catalyst is used in the first step and alkaline catalysts are used in the second and subsequent stages. The polycondensate product can be cross-linked with a suitable acid catalyst.

---

This invention relates to phenol-aldehyde resins. It more particularly refers to improved resins of the phenol-aldehyde type.

Phenol-aldehyde resins are amongst the oldest man-made plastic materials. They have known utility as molding material from which various and sundry shaped articles, particularly thermo setting shaped articles are made. Ureaformaldehyde and various furan derivative resins are also well known and have the same general utility as have the various known phenol-aldehyde resins.

It is an object of this invention to provide novel copolycondensates which have improved physical properties as compared to the prior art materials.

Other and additional objects of this invention will become apparent from a consideration of this entire specification including the claims hereof.

In accord with and fulfilling these objects, one aspect of this invention resides in a novel copolycondensate produced by polycondensing 0.1 to 1 mole of a phenol, 0.3 to 1 mole of a urea, 0.1 to 1 mole of a furan derivative which is reactive with phenol and/or urea, and 2 to 4 moles of an aliphatic aldehyde. This polycondensate is produced by stepwise reaction of these cocondensing materials, in the presence of an alkaline catalyst, to produce a liquid cocondensate which is suitably hardened by cross-linking.

When the reactants are used in this molar ratio with respect to each other, copolycondensates are obtained which can be hardened into cross-linked products by the addition of suitable catalysts, even in the cold. Especially suitable cross-linking catalysts for this purpose are inorganic and organic acids, such as phosphoric acid, sulfuric acid or toluenesulfonic acid, or compounds which form acids under the action of heat (e.g., ammonium chloride and ammonium nitrate).

The condensation of the individual starting components is performed step-wise with all or part of the reactants being combined in the individual steps. The multi-step condensation is characterized in that ordinarily either no catalyst is used in the first stage, or a catalyst is used in the first stage which is different than the one used in the subsequent stages. Alkalinely acting compounds are used as catalysts, such as alkali metal or alkaline earth metal oxides, alkali metal hydroxides or alkali metal carbonates. In the first step, the condensation can also take place in an acid medium. Furthermore, the condensation can also take place in an acid medium. Furthermore, the condensation time and temperature can be the same or different in the individual steps.

This condensation is suitably carried out in several stages or steps. The first step is run at about 50 to 110° C. for 5 to 50 minutes. The second stage is run at 50 to 110° C. for 20 to 100 minutes. The reactants may all be simultaneously added to the first step and the reaction steps carried out sequentially as above. Alternatively, and preferably, a portion of the reactants can be added in the first step and the remainder added thereafter.

For the preparation of the copolycondensates of the invention, the phenol components can be any phenol which can react with aliphatic aldehydes in a polyfunctional manner in this reaction. In general, those are phenols which are suitable for the preparation of the phenol formaldehyde resins of the prior art, such as phenol itself, substituted monovalent phenols such as cresols and xylenols, polyvalent phenols such as resorcinol, alkylene bisphenols, such as bisphenol-A, etc. Suitable mixtures of different phenols can, of course, also be used. The phenol may be mono or dicyclic. In the case of dicyclic phenols, the rings may be fused or not as the case may be.

Usable ureas are compounds which have removable hydrogen atoms attached to nitrogen, which are capable of reaction with aldehydes, and which are at least bifunctional in this reaction. Suitable ureas and urea derivatives are the known compounds used for the preparation of known urea- or melamine-formaldehyde resins. Especially well suited are urea and thiourea and their substitution products, particularly methyl and methylol ureas, melamine and its derivatives such as ameline or benzoguanamine. Also suitable are mixtures of different ureas and urea derivatives, such as mixtures of urea and melamine.

The furan derivatives involved in this invention are those which can react with phenols and/or ureas, such as furfurol or furfuryl alcohol.

The aldehydes that can be used for the preparation of the copolycondensates of this invention are saturated and unsaturated aliphatic aldehydes, especially saturated and unsaturated lower aliphatic aldehydes of 1 to 8 carbon atoms, such as acetaldehyde, propionaldehyde, acrolein, crotonaldehyde, butyraldehyde, formaldehyde, or mixtures of several of these aldehydes. The use of formaldehyde is preferred.

The copolycondensates of the invention are distinguished from phenolic resins by their better hardening speed and from urea resins by their higher bonding strength, especially after storage under moist conditions. In comparison with pure furan resins they are economically more attractive due to the use of cheaper and more easily obtainable starting substances.

The invention is illustrated by the following non-limiting examples.

EXAMPLE 1

A mixture of 164.5 g. of phenol (100%), 1200 g. of formaldehyde (37% aqueous solution) and 420 g. of urea is held at 100° C. for 25 minutes in a flash equipped with stirrer, reflux condenser and thermometer. After this period another 844 g. of formaldehyde (37% aqueous solution) and 500 g. of furfuryl alcohol are added. The contents of the flask are now heated again to 100° C., and as soon as this temperature is reached, 4 g. of $Na_2CO_3$ in the form of a 30% aqueous solution is added drop by drop. After the mixture has been kept at 100° C. for 75 minutes, the condensation is stopped and water is removed by vacuum distillation until a solid resin content of 40 to 80%, and preferably about 60%, is reached.

EXAMPLE 2

In an appropriate reaction vessel equipped with a reflux condenser and stirrer, 1800 g. of formalin (37% aqueous solution) and 630 g. of urea were heated to 100° C. and the mixture was held at this temperature for 12 min. Thereupon 1266 g. of formalin (37% aqueous solution) and 750 g. of furfuryl alcohol were added. The entire contents of the vessel were then heated again to 100° C.; as soon as this temperature was reached, 6 g. of $Na_2CO_3$ in the form of a 30% aqueous solution was added, and the condensation was continued for an additional 75 minutes at 100° C. At the end of this period 306 g. of phenol (100%) was mixed in. After thorough mixing the resin was dehydrated until a solid content of about 60% was reached.

To test the resins for their hardening speed and their bonding ability or mechanical strength, bending test rods were prepared using a standardized sand (Halterner Sand H32) and a resin content of 2% by weight, in a +GF+ test rod mold. The bending strength of these rods were measured at room temperature after hardening periods of various length. The hardener was a 70% aqueous phosphoric acid ($H_3PO_4$). The following table shows the results.

|  | Resin per— | |
| --- | --- | --- |
|  | Example 1 | Example 2 |
| Composition of the mixture: | | |
| Sand (grams) | 100 | 100 |
| Resin (grams) | 2 | 2 |
| Hardener (grams) | 0.33 | 0.33 |
| Bending strength in kp./cm.² after— | | |
| 1 hour at room temp | 7.5 | 5.5 |
| 3 hours at room temp | 29 | 19 |
| 5 hours at room temp | 43 | 40 |
| 8 hours at room temp | 65 | 56.5 |
| 24 hours at room temp | 59 | 58 |

What is claimed is:

1. A process for preparing a cold hardenable polycondensate which comprises:
   (a) in a first step, condensing at a temperature between 50 and 110° C. for between 5 and 20 minutes phenol, an aliphatic aldehyde and a urea in the absence of a catalyst and in the absence of a furan derivative;
   (b) in a second step, adding to the product of step (a) additional formaldehyde and a furan derivative selected from the group consisting of furfural and furfuryl alcohol and condensing the same in the presence of an alkaline catalyst at a temperature between 50 and 110° C. for between 20 and 100 minutes, the molar ratios of the reactants being in the following range:

Phenol _____ 0.1:1
   Urea _____ 0.3:1
   Furan derivatives _____ 0.1:1
   Aliphatic aldehydes _____ 2:4

2. Process according to claim 1 wherein the aldehyde is formaldehyde.

3. A process according to claim 1 wherein said phenol is at least one member selected from the group consisting of phenol, cresol, xylenol, resorcinol and bisphenol-A.

4. A process according to claim 1 wherein said urea is at least one member selected from the group consisting of urea, thiourea, methyl urea, methyl thiourea, methylol urea, methylol thiourea, melamine, ameline and benzoguanamine.

5. A process according to claim 1 wherein said aldehyde is at least one member selected from the group consisting of formaldehyde, acetaldehyde, propionaldehyde, acrolein, crotonaldehyde and butyraldehyde.

6. A process for preparing hardened polycondensates which comprises carrying out the steps of claim 1 and thereafter contacting the resulting product with an acid cross-linking agent.

References Cited

UNITED STATES PATENTS

| 2,471,631 | 5/1949 | Lebach | 260—56 X |
| 2,507,199 | 5/1950 | Eber | 260—51.5 X |
| 2,507,910 | 5/1950 | Keiser et al. | 260—56 X |
| 2,596,136 | 5/1952 | Ernst | 117—76 |
| 3,312,650 | 4/1967 | Case et al. | 260—56 X |
| 3,539,484 | 11/1970 | Bowman et al. | 260—51.5 X |
| 3,549,584 | 12/1970 | Sekera | 260—56 UX |

OTHER REFERENCES

"Chemistry of Synthetic Resins," Ellis, 1935, p. 672.
Chem. Abstracts, vol. 46, 1952, 2342i, Kobayashi.

HOWARD E. SCHAIN, Primary Examiner

U.S. Cl. X.R.

260—29.3

PO-1050
(5/69)

UNITED STATES PATENT OFFICE
CERTIFICATE OF CORRECTION

Patent No. 3,778,413  Dated December 11, 1973

Inventor(s) Hans Junger and Franz Weissenfels

It is certified that error appears in the above-identified patent and that said Letters Patent are hereby corrected as shown below:

Col. 1, line 72 - Col. 2, line 1

Delete the sentence "Furthermore, the condensation can also take place in an acid medium."

Signed and sealed this 27th day of August 1974.

(SEAL)
Attest:

McCOY M. GIBSON, JR.
Attesting Officer

C. MARSHALL DANN
Commissioner of Patents